(No Model.)
J. H. GARAGHTY & G. J. WORTHINGTON.
RAILWAY CATTLE GUARD.
No. 470,801. Patented Mar. 15, 1892.
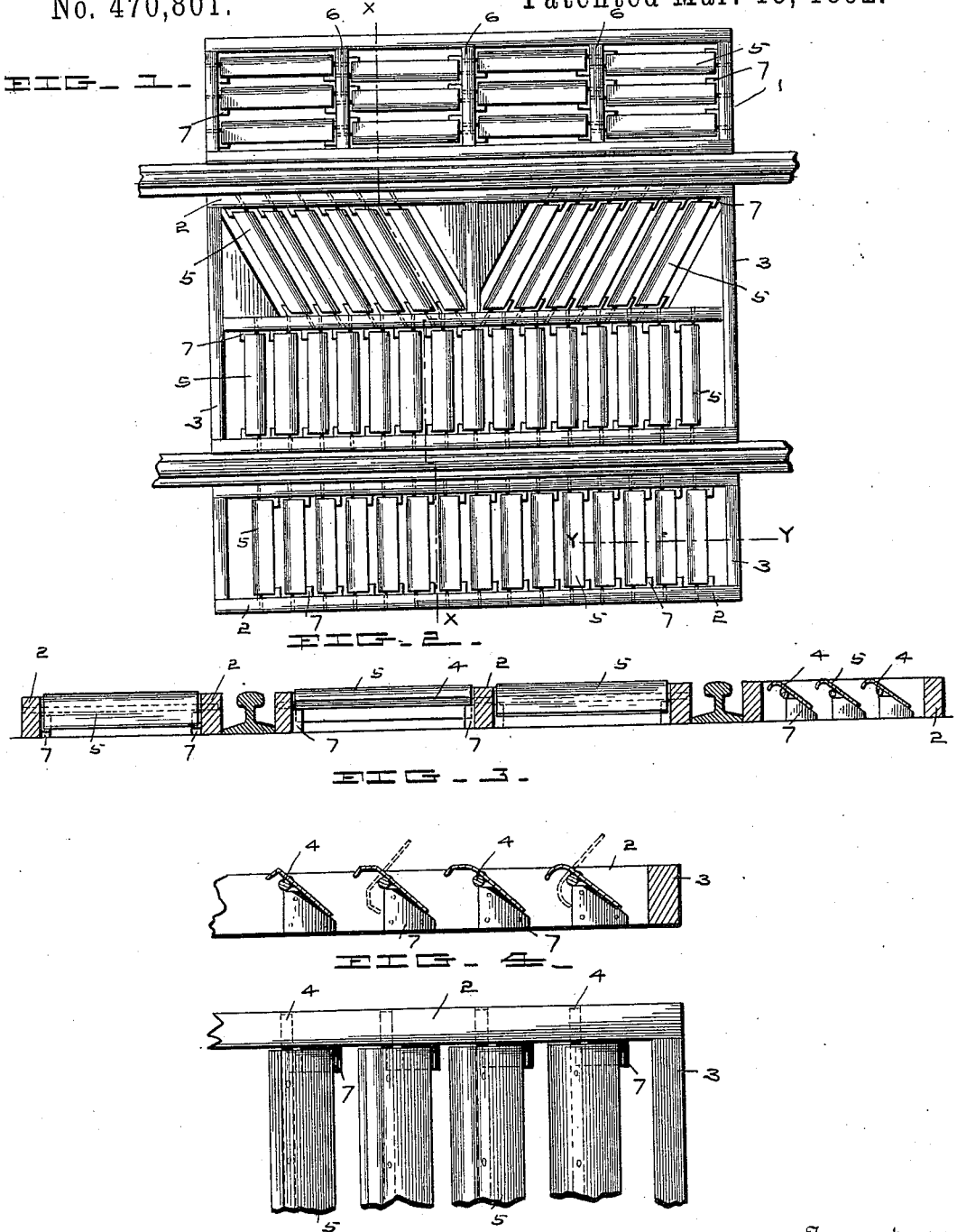

United States Patent Office.

JOSEPH H. GARAGHTY, OF COLUMBUS, OHIO, AND GEORGE J. WORTHINGTON, OF INDIANAPOLIS, INDIANA.

RAILWAY CATTLE-GUARD.

SPECIFICATION forming part of Letters Patent No. 470,801, dated March 15, 1892.

Application filed October 19, 1891. Serial No. 409,128. (No model.)

*To all whom it may concern:*

Be it known that we, JOSEPH H. GARAGHTY, of Columbus, county of Franklin, and State of Ohio, and GEORGE J. WORTHINGTON, a subject of Victoria, Queen of Great Britain and Ireland, residing at Indianapolis, county of Marion, State of Indiana, have invented certain new and useful Improvements in Railway Cattle-Guards; and we do hereby declare that the following is a full, clear, and exact description thereof, reference being had to the accompanying drawings, in which like figures refer to like parts.

Our invention relates to improvements in the construction of cattle-guards for railway-crossings and will be understood from the following description.

In the drawings, Figure 1 is a plan view of our device in place between and on the outside of the rails. Fig. 2 is an enlarged sectional view on the line $x\ x$, Fig. 1. Fig. 3 is a sectional view, still further enlarged, on the line $y\ y$, Fig. 1. Fig. 4 is a detail plan view of Fig. 3.

1 is a frame-work formed of longitudinal and horizontal pieces 2 and 3, in which are bearings for the rods 4, to which are secured in any suitable manner the tilting slats 5. In Fig. 1 the slats are shown secured in the frame-work in a horizontal position in the two lower sections. In one of the upper sections they are shown set in the frame-work at an oblique angle, one side reversed with respect to the other, and the one above is divided by cross-pieces 6, and the slats are set longitudinally in the frame-work. At either end, just beneath the slats, blocks 7 are secured to the frame, and when in their ordinary position the lower edges of the slats rest on these blocks, one side of which is cut off, so as to hold the slats at an angle of about forty-five degrees, as shown in Fig. 3. When an animal attempts to cross the guard upon the upturned edges of the slats, they will be tipped up, as shown in the dotted lines in Fig. 3, and when the pressure is removed they will automatically fall back to their first position, making it difficult and inconvenient for animals to pass the guard.

The slats 5 are preferably formed of metal, and one edge is turned over in any one of the shapes shown in Fig. 3.

The frame-work 1 may be made either of wood or metal, as desired, and rests on the ground on a line with the base of the rails and is about the height of the rail itself, and the slats 5 may extend to the top or above the frame-work, provided they do not extend above a point where the pilot of the engine or any projection from the train would strike them while passing along the rails. The slats are preferably arranged to tilt in different directions in the several sections, thus making it more difficult for cattle to pass.

It will be observed that the slats are so journaled that they will never form a flat surface, but will always present an angle on one side or the other of the rods to which they are secured, and by reversing the slats with reference to each other, so that a part will tip in one direction and a part in another, the animal, if it persists in the attempt to cross the guard, will find its feet caught and strained in opposite directions, thus preventing any leverage being exercised upon either foot to enable it to use the other to advantage.

We are aware that cattle-guards have been constructed wherein the surface is formed of tilting slats; but these have been set, so far as we are aware, so as to form, ordinarily, a flat upper surface and only swinging in one direction; but this arrangement will not prevent breachy cattle from getting across the guard. In our device, on the contrary, the slat always presents an oblique or inclined face, and when the animal's foot strikes it the pressure causes the slat to wobble alternately in both directions, and if the animal attempts to proceed the slat will be inversely tilted and the animal's foot will slide downward and forward, and this will make it difficult to proceed and it will back and get out of the guard.

What we claim as our invention, and desire to secure by Letters Patent, is the following:

1. In a railway cattle-guard, a frame-work and inclined slats pivoted therein, their lower edges resting on blocks holding them at an angle and adapted to be tipped above a horizontal line by pressure applied on their upper edges, substantially as shown and described.

2. A railway cattle-guard comprising an open frame-work and a series of slats mounted on rods journaled in the sides of the frame and at one side of their center, such slats normally presenting an inclined surface at the top, the lower or heavier edge of the slats resting on blocks or stops attached to the frame-work, whereby when pressure is applied to the upper edge of the slat it will be tipped downward and the lower edge raised upward above a horizontal line, and when pressure is released the slats will automatically return to their normal position, substantially as shown and described.

In witness whereof we have hereunto set our hands this 16th day of October, 1891.

JOSEPH H. GARAGHTY.
GEO. J. WORTHINGTON.

Witnesses:
E. B. GRIFFITH,
H. D. NEALY.